United States Patent [19]

Schiff

[11] Patent Number: 4,616,362

[45] Date of Patent: Oct. 7, 1986

[54] LOGIC FOR CALCULATING BIT ERROR RATE IN A DATA COMMUNICATION SYSTEM

[75] Inventor: Leonard N. Schiff, Lawrence Township, Mercer County, N.J.

[73] Assignee: RCA Corporation, Princeton, N.J.

[21] Appl. No.: 632,423

[22] Filed: Jul. 19, 1984

[51] Int. Cl.$^4$ ............................................. G06F 11/00
[52] U.S. Cl. ............................................................ 371/5
[58] Field of Search ........................................ 371/5, 6

[56] References Cited

U.S. PATENT DOCUMENTS

| | | | |
|---|---|---|---|
| 3,721,959 | 3/1973 | George | 371/5 |
| 4,034,340 | 7/1977 | Sant'Agostino | 371/5 |
| 4,054,863 | 10/1977 | Goodman et al. | 371/31 |
| 4,234,954 | 11/1980 | Lange et al. | 371/6 |
| 4,367,550 | 1/1983 | Douverne | 371/6 |
| 4,375,099 | 2/1983 | Waters et al. | 371/6 |
| 4,387,461 | 6/1983 | Evans | 371/5 |

Primary Examiner—Charles E. Atkinson

Attorney, Agent, or Firm—Joseph S. Tripoli; Robert L. Troike; William H. Meise

[57] ABSTRACT

A system for determining the bit error rate in a communication system comprising logic for generating a stream of data bits, bit extracting logic for periodically extracting N consecutive bits after the occurrence of every Mth bit, where the N consecutive bits are divided into a group of A bits and a group of C bits, where A and C are equal integers, and a single B bit is positioned between the group of A and C bits, where $M>>A$, where the N bits can be any combination of binary 1's and 0's. Logic extracts and stores a finely quantized sample of the B bit of each group of N bits. An adder adds an auxiliary group of X bits to the N bits to form a memory address consisting of A, B, C, and X bits. A plurality of memories each has storage locations for a single finely quantized B bit sample. Each memory further is selectable by a unique combination of the binary bits $A+B+C$ with any given storage location in each memory being accessible by various combinations of the X bits. Appropriate logic by a predetermined algorithm calculates the current probability of bit rate error.

2 Claims, 15 Drawing Figures

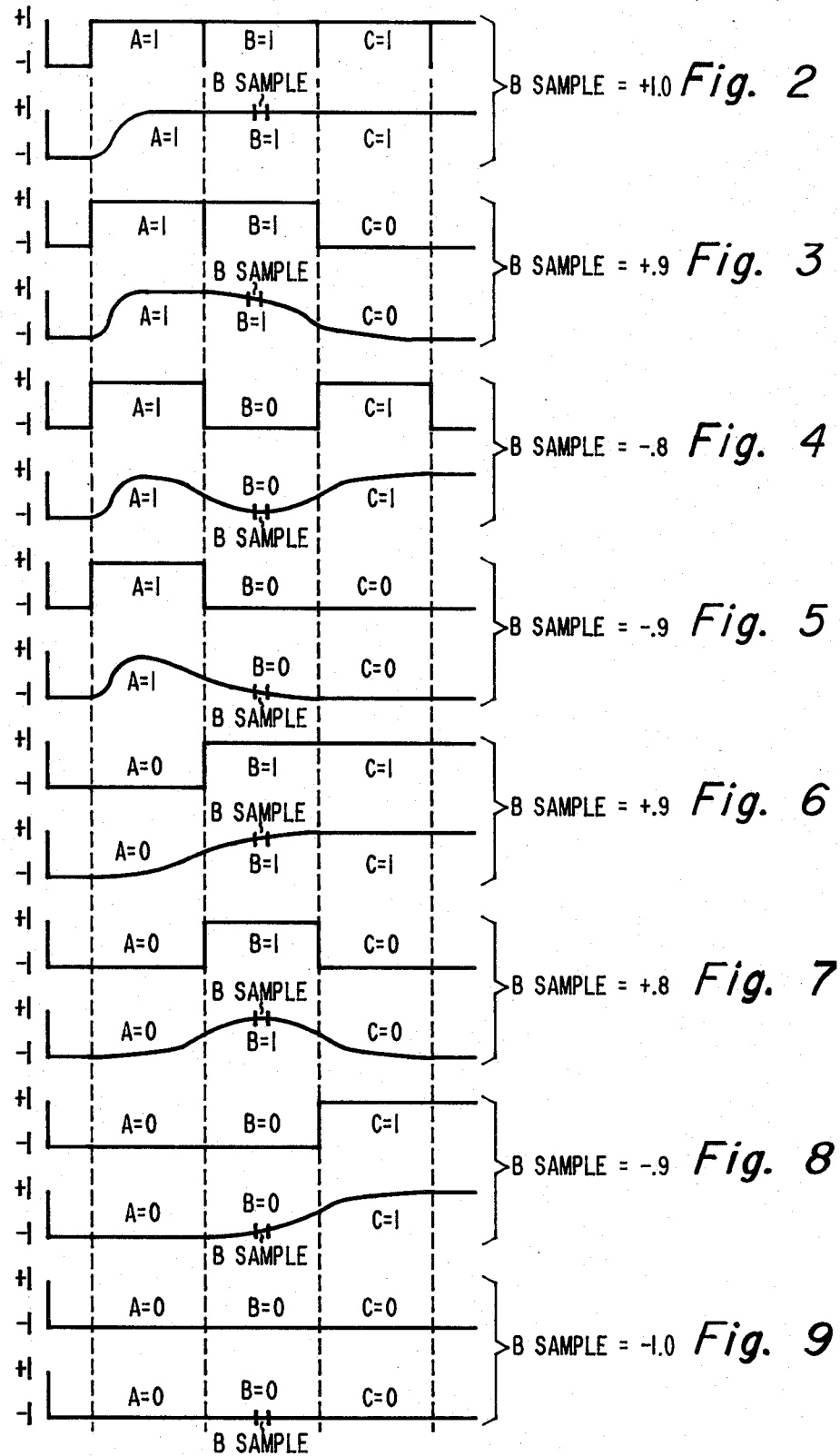

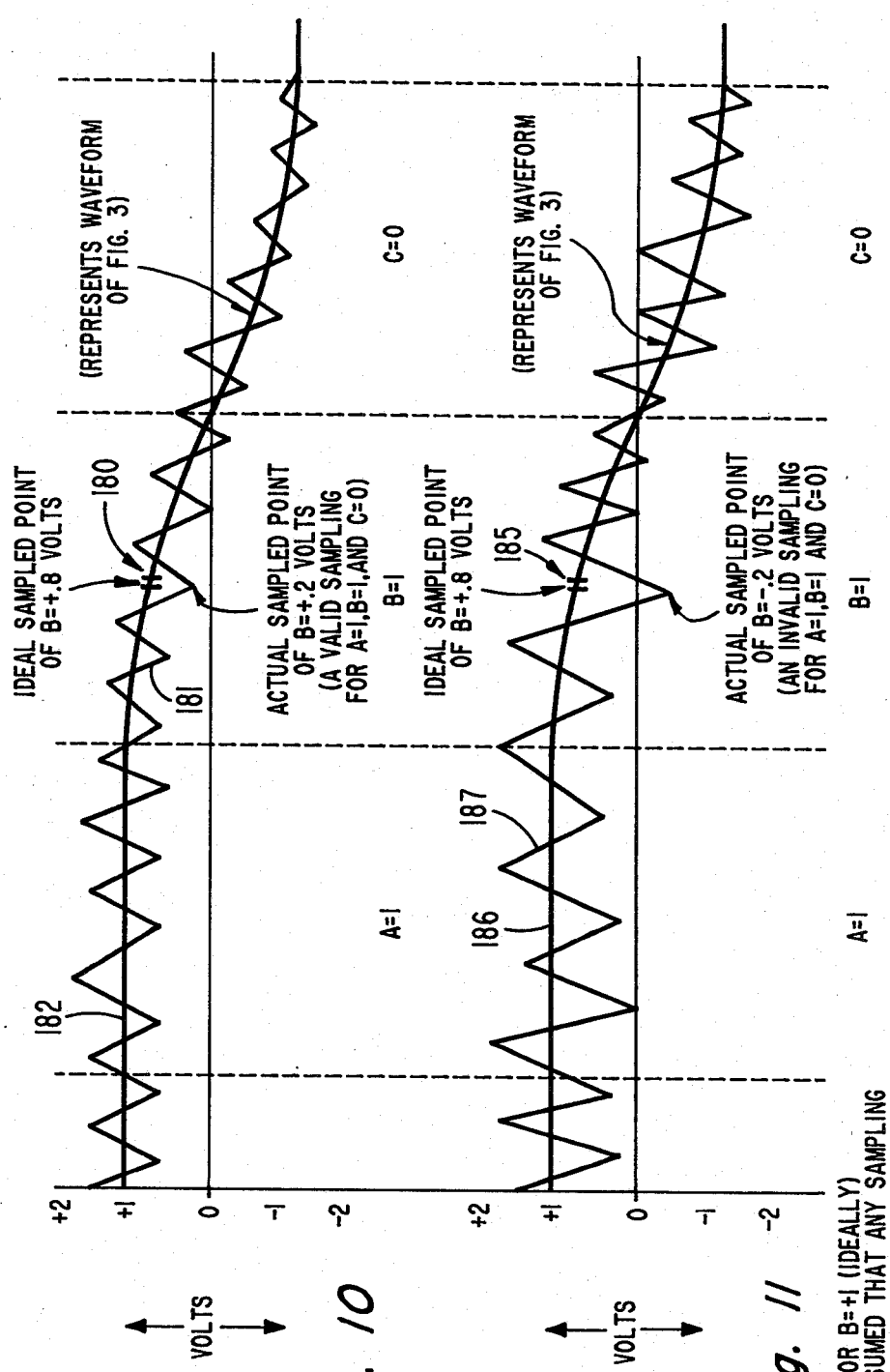

LOGIC FOR CALCULATING BIT ERROR RATE IN A DATA COMMUNICATION SYSTEM

This invention relates to structure for determining the bit error rate in a communication system employing the transmission of bits and, more particularly, to such a bit error rate determination system including those errors which are in part due to the rounding off of the leading and trailing edges of otherwise square wave bit representing signals caused by the very high transmission rate of originally square wave bit representing signals extending back into the preceding bit and forward into the following bit to cause distortion thereof (intersymbol interference) in addition to the always present so-called white noise source of distortion.

Traditionally, the most common source of distortion introducing noise is thermal noise of one type or another. Assume, for example, that in the prior art the incoming bits representing binary 1's or 0's ideally would be represented by a rectangularly shaped waveform of +1 volt in magnitude or a waveform −1 volt in magnitude so that the differentiation between the two would be relatively easy. Such differentiation is usually accomplished by sampling the bits as they arrive somewhere in the middle of the bit period to permit the bit to settle down to its nominal value.

In the presence of thermal noise, however, it is possible that at the time of sampling the +1 volt bit representing a binary 1 can be +0.2 volt or even a −0.1 volt. On the other hand a bit representing a binary 0 and normally having a −1 volt amplitude can, at the time of sampling, be distorted to the point where it can have a −0.15 volt value or even a small plus value, such as +0.05 volt value. Distortion as great as described above, if it occurs sufficiently often, can make the message unintelligible. However, such distortion does not often occur with such frequency. It can be shown statistically that if thirteen out of every one thousand bits fall somewhere between +0.1 volt and −0.1 volt only two of such readings are in fact erroneous so that of the one thousand received bits, 998 can be regarded as accurate by defining them as binary 1's if they are positive in value and as binary 0's if they are negative in value.

As the technology has advanced, it has become increasingly advantageous to transmit bits at higher and higher rates. As the transmission rate of the originally square wave bits increases, the leading and trailing edges begin to round off and extend backwards and forwards into the preceding and following bits, thereby increasing another form of serious distortion. Depending upon the rate of bit transmission speed, the effect of the trailing and leading edges of preceding bits and those of subsequent bits can extend beyond the two adjacent bits to the particular bit being sampled. In other words, it is possible that the effect of the rounding off of the trailing and leading edges of the second, third, or even fourth preceding bits as well as the leading and trailing edges of the subsequently occurring second, third or fourth following bits, can have an effect on the shape of the bit being sampled and whose nature (whether it's a binary 1 or a binary 0) is being determined.

For the sake of simplicity in the current specification, it will be assumed that the primary distortion on the bit being considered is limited to the immediately preceding and the immediately following bit.

It is a primary advantage of the present invention to determine the transmission quality of a given bit-representing signal with the same degree of precision in high speed bit transmission systems as well as in low speed bit transmissions systems, and in both cases with the same degree of thermal noise present.

In accordance with a preferred form of the invention there is provided logic for determining the probable bit error rate in a communication system and comprising a bit generator for generating a stream of bits at a bit rate $f_c$, bit extracting logic for periodically isolating N consecutive bits after the occurrence of every Mth bit where the N consecutive bits are divided into a group of A bits, a B bit, and followed by a group of C bits, where A and C are equal integers, where the B bit is positioned between the groups of A and C bits, where $M >> A$, where the groups of A and C bits can be any combination of binary 1's and binary 0's if A and C are greater than one, and where bit B can be either a binary 1 or a binary 0. Also provided is other logic for isolating and storing the B bit of each group of N isolated bits; an adder for adding an auxiliary group of X bits to each group of N bits to form a memory means address consisting of the A, B, C, and X bits.

A plurality of memories is provided each having a plurality of storage locations with each memory being accessible by a unique combination of the binary bits A, B, and C, and with any given storage location in said each memory being accessible by the X bits. Each memory further comprises a series of storage locations such capable of storing a single digitized B bit and is responsive to the memory addresses to store the digitized form of the B bit in the single bit storage location of the accessed memory location. A processor for processing the stored values of the B bit in any given plurality of memories in accordance with a first predetermined algorithm determine the upper and lower value limits of the B bits for given combinations of the bits A, B, and C; and a calculator determines, by a second predetermined algorithm, what percentage of the values of the B bits fall outside the predetermined upper and lower limits of the memory locations and to thereby determine the current bit error rate.

In the drawings:

FIG. 1 shows a combination block and logic diagram of a portion of a preferred form of the invention;

FIGS. 2 through 9 show the eight possible combinations of 1's and 0's of three bits, identified as bits A, B, and C, (where A and C represent 1 bit) with bit B being the center bit to be sampled to determine whether it is a binary 1 or a binary 0 and further showing the distortion introduced into bit B by the rounded trailing and leading edge of the preceding and trailing bits A and C, respectively;

FIGS. 10 and 11 show the combination of the three bits A, B, and C of FIGS. 2-9 with thermal noise superimposed thereon and how such thermal noise affects the validity of the sampling of bit B;

Figure 1:
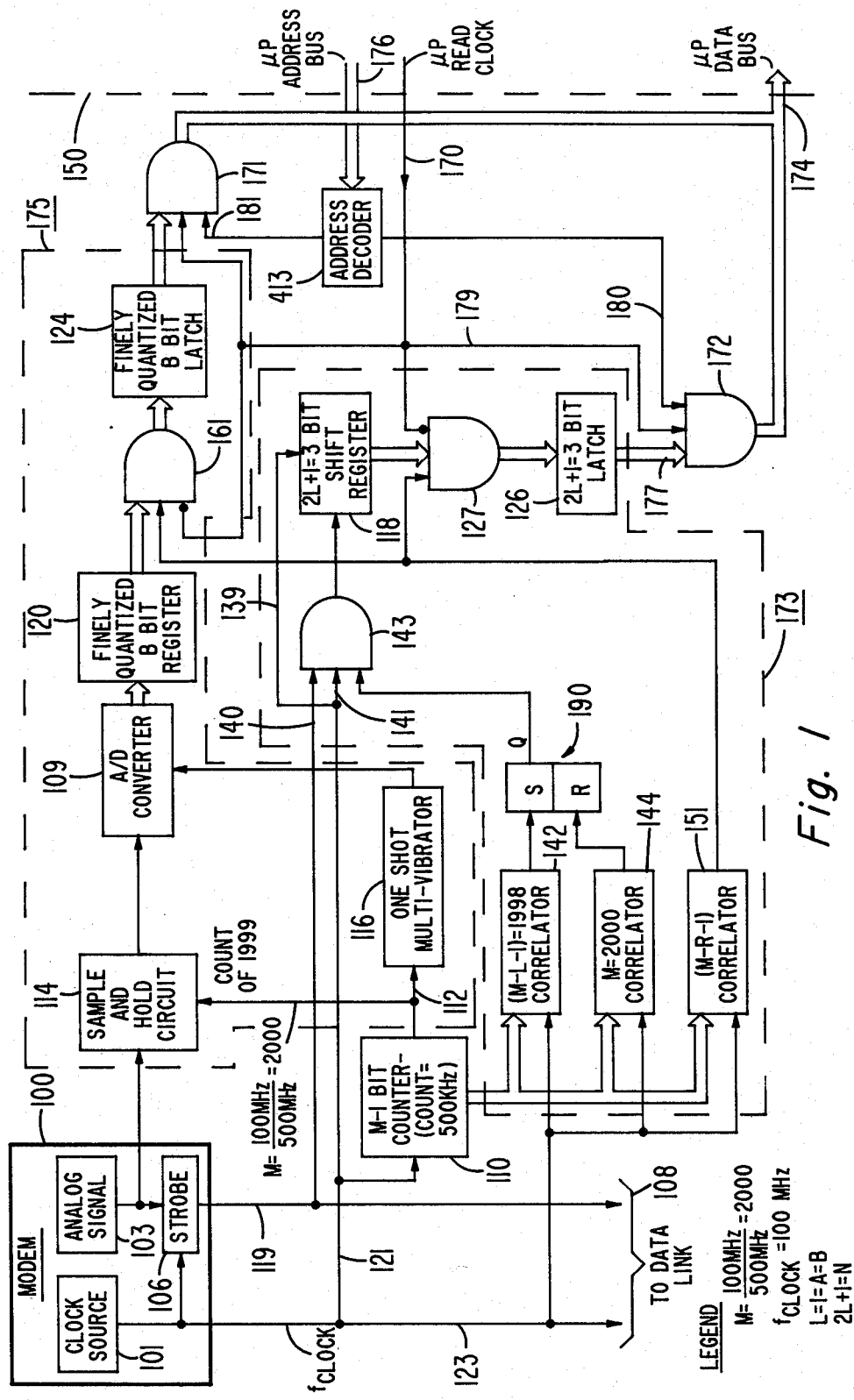

Referring now to the block and logic diagram of FIG. 1, modem 100, which is the source of the stream of bits, contains a clock source 101 which determines the bit rate, an analog signal 103 from which the bits are derived and a strobe circuit 106 which responds to both clock source 101 and analog signal source 103 to output a bit stream on lead 119, which is supplied to a data link 108 and also to input 140 of AND gate 143. The output of clock source 101 is also supplied directly to shift register 118 via leads 121 and 139 to control the timing of the shifting of the bits therein, as will be discussed in detail later.

The two leads 123 and 119 go to the data link 108 and are subsequently processed in the usual manner as incoming data bits. The actual invention lies in the remainder of the circuit of FIG. 1 which can be divided generally into two sections. One of these sections is the logic within dotted block 173 and the other is the logic within dotted block 175. A third section can be defined as the bit counter 110 which is common to both the logic within dotted blocks 173 and 175.

As an example of operation, assume the modem receives bits at a 100 MHz rate and that counter 110 is designed to recycle at a count of 1999 or after every 2000 clock pulses. The counter would then emit pulses at a 50 KHz rate. The bit counter 110 is designed so that at the count of 1,999 (M=2000), a pulse appears on output terminal 112 which enables the sample and hold (S/H) circuit 114 and thereby stores the amplitude of the analog signal generated during that interval of time in the analog signal source 103. In the absence of any thermal noise or interference, and assuming that the analog signal is either a +1 volt or a −1 volt, the contents of the S/H circuit 114 will be either a +1 volt or −1 volt. However, as discussed above, both thermal noise and intersymbol interference are present, so that the contents of S/H circuit 114 can vary widely and must be interpreted.

Because such interpretation is done in the microprocessor which is shown very broadly to the right of vertical dotted line 150 in FIG. 1, the contents of the S/H circuit 114 are converted to a digital value in analog-to-digital (A/D) converter 109 after an appropriate delay to permit settling of the values in the S/H circuit 114. Such appropriate delay is provided by a one-shot multivibrator 116 which responds to the same output pulse from bit counter 110 (the count of 1,999) as does the S/H circuit 114.

The finely quantized form of the sampled signal from analog signal source 103 is stored in an appropriate finely quantized B bit register 120 whose output is supplied to a group of inputs of AND gate 161 which, when fully enabled, will pass the finely quantized value of the B bit sample stored in register 120 to the finely quantized B bit latch 124.

As will be recalled, it has been assumed that only the first preceding bit A and first subsequent bit C following the sampled bit B will be considered as causing significant intersymbol interference. It is apparent that there are eight combinations of binary 1's and 0's in a combination of three bits. If the first bit is received during the 1,998th counter of bit counter 110 and labeled bit A, and the second bit is received during the 1,999th count of bit counter 110 and labeled bit B, and the third consecutive bit in the sequence is received during the 2,000th count of bit counter 110 (which for the counter is the new 0 count) and labeled bit C, then the eight possible combinations of binary 1's and 0's is as follows.

| Bit A | Bit B | Bit C |
|-------|-------|-------|
| 1 | 1 | 1 |
| 1 | 1 | 0 |
| 1 | 0 | 1 |
| 1 | 0 | 0 |
| 0 | 1 | 1 |
| 0 | 1 | 0 |
| 0 | 0 | 1 |
| 0 | 0 | 0 |

These eight combinations of binary 1's and 0's for bits A, B, and C are shown in FIGS. 2–9 and in each case the sampling is made during the occurrence of bit B, as indicated in FIGS. 2–9.

The identification storage of bits A, B, and C is accomplished by the bit counter 110 and the logic within dotted block 173 including the three correlators 142, 144, and 151, and AND gate 143, the three stage shift register 118, AND gate 127, and latch 126.

More specifically, in the example being discussed, the number of bits immediately preceding and following the bit B to be sampled are single bits, namely, bits A and C. This number of bits immediately preceding and following bit B is represented by the letter L, so that L is equal to one in the current example, and N=2L+1. Thus, correlator 142 detects the count of 1,998 which is equal to 2,000−1−1 and supplies a set input to flip-flop 190, thus raising the Q output of flip-flop 140 to a high level and priming AND gate 143 so that the three sampled bits A, B, and C from strobe source 106 will pass therethrough and to three stage shift register 118.

It is to be noted that only three bits will pass through AND gate 143 since correlator 144 will respond to the occurrence of the count of 2,000 (i.e., 0) to supply a reset signal to the reset input of flip-flop 140, thus lowering the Q output of flip-flop 140 to a low level to disable AND gate 143. However, by this time three clock pulses from clock source 101 will have occurred via lead 121 and three consecutive samples A, B, And C will have been entered into shift register 118, including the bit B, which has also been sampled by S/H circuit 114 at the count of 1999 from counter 110, converted to a finely quantized value in A/D converter 109, and stored in bit register 120.

At some later time equal to R clock periods the correlator 151 will supply a signal to enable AND gates 161 and 127. The purpose of the correlator 151 is to delay the shifting of the signal contents of the registers 120 and 118 into the latches 124 and 126, respectively, until such signal contents have had a chance to settle and thus avoid errors due to transient conditions. R can be any convenient number of clock pulses such as, for example, 1000, which will allow ample time for such settling of the signal in bit register 120 and shift register 118.

During the read clock pulse generated in the microprocessor and appearing on lead 170 the contents of latches 124 and 126 are supplied through AND gates 171 and 172 to the common microprocessor data bus 174. However, latches 124 and 126 cannot acquire the contents of bit register 120 and shift register 118 after the read clock pulse on lead 170 occurs. Therefore, if the read clock pulse should occur before the transfer of the data from bit register 120 and shift register 118, such transfer of information cannot pass through AND gates 161 and 127 because of the inhibiting nature of the read clock pulse appearing on lead 170 upon AND gates 161 and 127.

Thus, the transfer of information from bit register 120 and shift register 118 to latches 124 and 126 must occur in the absence of the read clock pulse on lead 170 and during the output of bit correlator 151.

Then, and only then, will a read clock pulse supplied via lead 170 cause the contents of the latches 124 and 126 to be transferred through AND gates 171 and 172 to microprocessor data bus 174. It will further be observed that such transfer of the information from latches 124 and 126 through AND gates 171 and 172 is dependent upon high level signals being supplied from address decoder 413 to inputs 181 and 180 of AND gates 171 and 172 to complete the enablement of AND gates 171 and 172.

The generation of the address bus on μ processor address bus 176 and the read clock pulse on lead 170 occurs within the microprocessor in the correct timing relationship to pass the information from latches 124 and 126 through AND gates 171 and 172 to microprocessor data bus 174. The data bus 174 consists of six leads which in turn consists of three pairs of leads indicating the nature (i.e., a binary 1 or a binary 0) of each of the bits A, B, and C, and which is either a +1 volt or a −1 volt, as indicated in the drawings of FIGS. 2-9.

The binary values of the three bits A, B, and C constitute a portion of an address to one section 200 (see FIG. 15 to be described later) of eight different sections of a RAM, one RAM section for each of the eight possible combinations of the three binary bits A, B, and C.

Since the finely quantized samplings of bit B are taken periodically over a period of time and normally represent many samplings, such as, for example, 64, each section of the RAM must be capable of holding 64 finely quantized samplings of bit B. This means that an additional 6 bits must be added to each of the three bits A, B, and C to provide enough address bits to not only determine which of the eight sections of the RAM the three bits A, B, and C should be entered, but also to keep track of the order in which they are received and entered in the selected section of RAM. Such an arrangement requires counter logic which will count from 0 to 63 as each similar combination of the bits A, B, and C are received. Logic for the foregoing function is shown in FIG. 12 which will be discussed in more detail in the discussion of FIG. 12.

Figure 12:
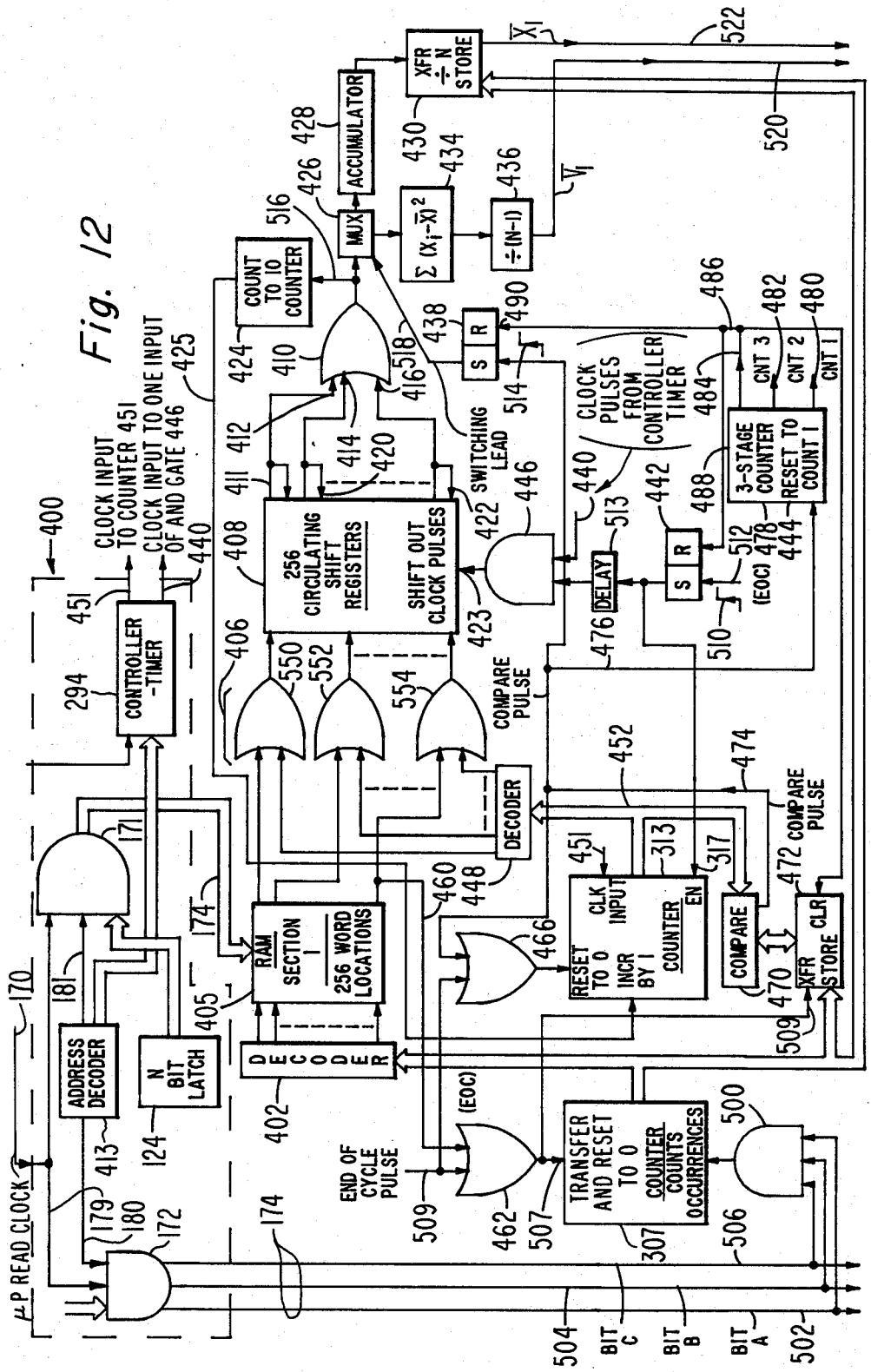
FIG. 12 shows a diagram of a portion of the equivalent computer logic employed in calculating the probability of bit error rate.

It is understood that FIG. 12 is a hardware embodiment of the data processing portion of the system. The alternate embodiment is a microprocessor replacing the hardware of FIG. 12 in which the software provides programming to replace the hardware.

At the end of some appropriate time period, all of the finely quantized (digitized) values of bit B in each of the eight sections of the RAM are used to form an average value. Then, with the aid of known algorithms an average error probability is calculated based on the stored RAM data. This computed error probability can be displayed to a technician. If the bit error rate exceeds a certain value then certain remedial steps can be taken by the technician to make the necessary corrections, such as increasing the strength of the signal at the transmitter. The whole purpose of this invention is to sample, store and compute data that enables the value of the bit error rate to be displayed to the technician on a quality measure of the modem output.

Before considering the logic which calculates the current bit error rate from the statistical information derived from the tolerances discussed above, the waveforms of FIGS. 10 and 11 will be discussed. In the waveforms of FIGS. 10 and 11 there is shown the effect of thermal noise on the bit samplings. More specifically, FIG. 10 shows the effect of thermal noise on the B bit sample of FIG. 3 where the thermal noise at the sampling interval 180 is insufficient to invalidate the sampling, whereas in FIG. 11 the thermal noise at sampling interval 185 is large enough to invalidate the sampling at the sample interval 185 of bit B.

In FIG. 10, the thermal noise, as represented by the jagged line 181, dips below the sampling interval 180 of bit B, but does not go below the zero volt line. The lowest point to which the sampling plus the thermal noise brings the resultant signal is approximately +0.2 volts which, in fact, is considered a valid sampling as measured by the algorithm which will be discussed in more detail in connection with FIGS. 12 and 13.

However, in FIG. 11 the thermal noise at the sampling interval 185 is large enough to bring the resultant signal below the zero voltage value to a value of about −0.2 volts, which, when subjected to the algorithms inherent in the logic of FIGS. 12 and 13 to determine bit error rate, will result in determination of an invalid sampling for the combination of bits A, B, and C when bits A, B, and C are a binary one, a binary one, and a binary zero, respectively.

It must be remembered that the situation inherent in FIG. 11 is an extraordinarily rare event. In the commercial environment in which this invention will be used the probability of error might be, for example, $10^{-9}$. Even if a thousand or so samples are taken, for the algorithm to calculate (project) the bit error rate the probability of the event depicted in FIG. 11 occurring is less than one in $10^6$. If such an event does occur, as it inevitably will over a long enough period of time, the result will be a wildly erroneous reading of bit error rate that will be displayed by the unit. This causes no problem in this kind of situation as the technician will only take remedial action after a number of successive poor error rate readings occur.

In the normal case where a microprocessor is used to calculate bit error rate from the samples, it is nonetheless possible to use other algorithms than the ones disclosed herein to identify such erroneous situations. These other algorithms use statistical techniques based on the values of the other samples and thereby expunge the erroneous sample from the collected data.

Figures 13, 14:
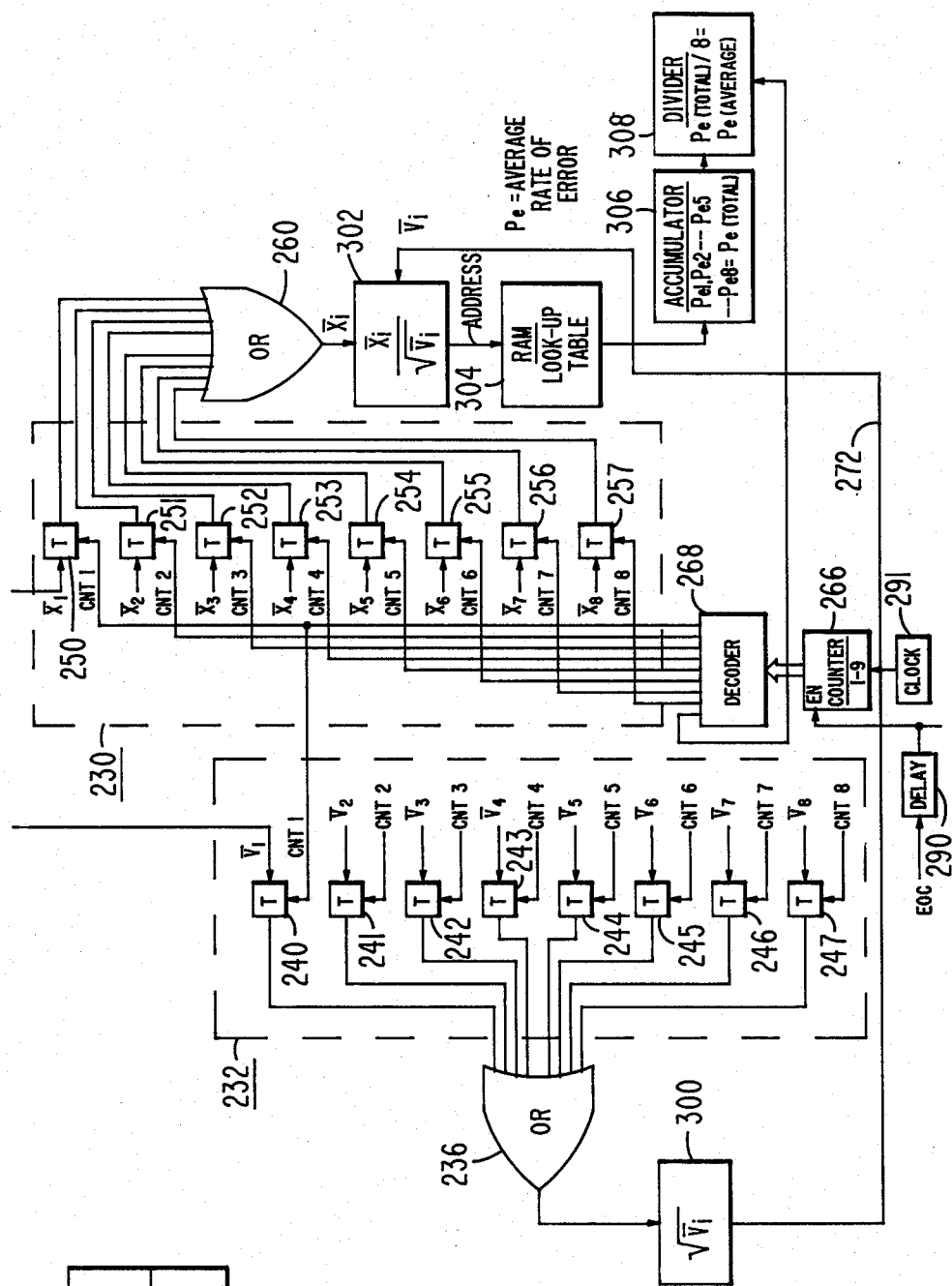
FIG. 13 shows a diagram of another portion of the equivalent computer logic employed in calculating the probability of bit error rate.
FIG. 14 shows how FIGS. 12 and 13 fit together.
Figure 15:
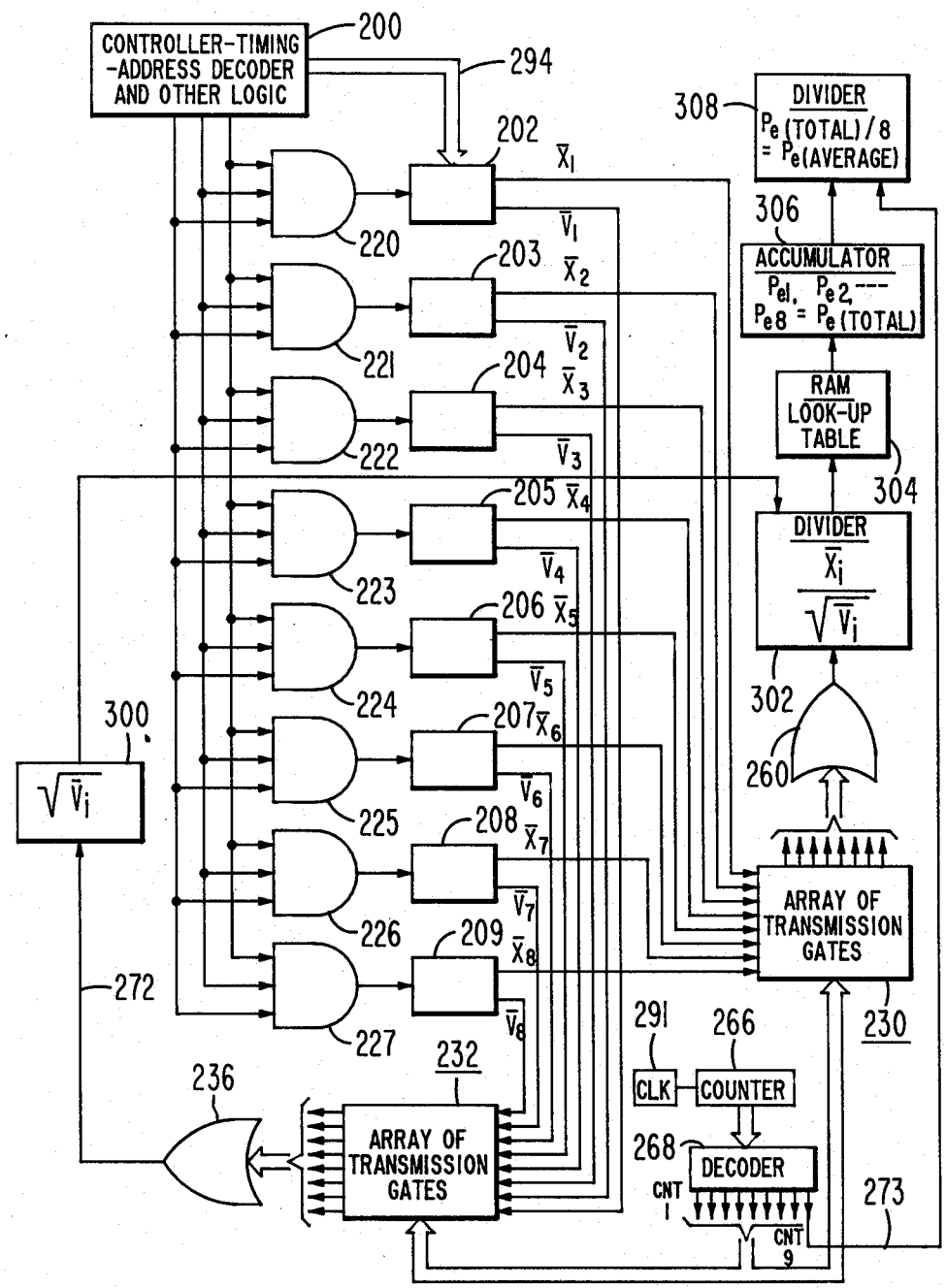
FIG. 15 is a broad, generalized diagram of the entire system.

Referring now to FIGS. 12, 13, and 15, there is shown logic for calculating the bit error rate from the sample obtained by the apparatus shown in FIG. 1. The logic of FIGS. 12-15 should be considered together for the following reasons. All of the logic of FIG. 12 is repeated eight times in the actual system with each repetition being shown by one of the blocks 202 through 209 of FIG. 15. Thus, block 202 of FIG. 15 contains logic which is the same as all of the logic shown in FIG. 12.

Blocks 203-209 of FIG. 15 represent circuits for processing the remaining seven combinations of bits A, B, and C, as shown in FIGS. 2 and 4-9. Further, the AND gate 500 of FIG. 12 has seven additional corresponding AND gates 220, and 222-227 shown in FIG. 15, each of which feeds into one of the logic circuits 202, and 204-209, respectively, of FIG. 15 in a manner similar to that by which AND gate 500 is connected to the logic of FIG. 12.

In FIG. 13 the calculated values of $X_1$-$X_8$ are supplied via leads such as lead 522 of FIG. 12 individually to the inputs of individual ones of the array of transmission gates 250-257 of FIG. 13, shown collectively as a single block 230 in FIG. 15. Similarly, the eight calculated values $V_1$-$V_8$ are supplied via leads such as lead 520 of FIG. 12 individually to the inputs of individual ones of the array of transmission gates 240-247 of FIG. 13 and represented by the single block 232 of FIG. 15.

The accumulator 306, dividers 302 and 308, clock 291, counter 266, and decoder 268 of FIG. 13 correspond to the accumulator 306, dividers 302 and 308, clock 291, counter 266, and decoder 268 of FIG. 15. The delay 290 of FIG. 13 provides the proper time interval for the calculations and accumulations of FIG. 13.

The logic of FIGS. 12 and 13 will now be described in detail. It will be understood that such description to follow will also be a description applicable to all of the blocks 202-209 of FIG. 15 and that the description of the operation of the transmission gate arrays 230 and 232 of FIG. 13 also applies to the identical (corresponding) transmission gate arrays 230 and 232 of FIG. 15.

Referring now to FIGS. 12, 13 and 14, assume that a sampling of the A, B, and C bits has been taken and that each of the three A, B, and C samples are binary ones. Assume further that this pattern of three binary ones is supplied via the three leads 502, 504 and 506 from the gate array 400 of FIG. 12.

Assume further that AND gate 500 of FIG. 12 responds to the three binary ones (A, B, and C) to increment the counter 307 of FIG. 12 by one. Counter 307 in fact functions to count those occurrences of the combinations of all binary ones of the three sampled bits A, B and C as they occur in the stream of bits supplied from the analog source 103 of FIG. 1, beginning at count 1998 of counter 110, as discussed previously.

At the end of each period of sampling which, as discussed above, includes the sampling of many groups of the three bits A, B, and C, an end-of-cycle pulse is supplied to an input 509 of storage means 472 which functions to transfer the count in counter 307 to storage means 472 for purposes that will be discussed later. A similar transfer of the count therein from counter 307 to storage means 472, will occur if the RAM 405 becomes full, that is, if all 256 word locations therein become full and a signal is generated on output lead 460 back through OR gate 462 to reset-to-zero input 507 of counter 307. Also, an end-of-cycle pulse will reset counter 313 to 0.

Thus, it can be seen that counter 307 starts counting the occurrences of each combination of all binary ones of the binary bits A, B, and C from zero value at the beginning of each end-of-cycle pulse. Decoder 402 decodes the count in counter 307 to address the corresponding word location in RAM 405. The first occurrence of the pattern of three binary ones for bits A, B and C will address word location one in RAM 405 and cause the output of AND gate 171 to be entered into word location one of RAM 405 via bus 174.

As will be recalled from the discussion of FIG. 1, the output of AND gate 171 on bus 174 is a finely quantized value of the sampling of B bit of the three bits A, B, and C being considered at that time.

When the second occurrence of all binary ones occurs for binary bits A, B, and C, counter 307 will be incremented by one via AND gate 500 and decoder 402 will respond thereto to address word location two of RAM 405 so that the finely quantized (binary) value of the sampling of bit B of the second group of bits A, B, and C is entered into the second word location of RAM 405. This foregoing process continues until one of two events occurs, as will be discussed below.

In the first event, when the end-of-cycle pulse occurs and is supplied to lead 509 and then through OR gate 462 to reset counter 307 to zero, the contents of the counter 307 will be transferred to storage means 472, as discussed above, and for purposes to be described later. Secondly, if all 256 word locations of RAM 405 become full, a signal is supplied to the reset-to-zero input 507 of counter 307 via lead 460 and OR gate 462 to also store the contents of counter 307 in storage means 472. No further processing will be done until the entry of the combinations of the binary bits A, B, and C into all eight of the RAMs of the entire system, similar to RAM 405, have been completed.

As mentioned above, the end-of-cycle pulse can occur before all of the RAMs such as RAM 405 become full. It is only necessary that each of the RAMs have stored therein a sufficient number of bit samplings on which to base calculations designed to give a reasonably precise current bit error rate by means of the remaining logic shown in FIGS. 12 and 13 which will now be described in the paragraphs below.

When the end-of-cycle pulse finally occurs it will pass through OR gate 466 to reset-to-zero counter 313 and reset to the count of one the three-stage counter 478.

The rising edge of the end-of-cycle pulse will also be supplied to the set input of flip-flop 442 as indicated by the small rising edge waveform 510 to set flip-flop 442. The setting of flip-flop 442 enables the counter 313 to count the occurrences of combinations of all binary ones of bits A, B, and C, as discussed above, starting from zero count. The high level set output of flip-flop 442 is also supplied through delay 513 to an input of AND gate 446 to permit the clock pulses from clock pulse 440 (which are generated in controller timer 294) to pass through AND gate 446 and shift the data in the circulating shift register of the bank of circulating shift registers 408 therefrom in a manner to be discussed later below.

Delay 513 has a very short time delay interval and is included in the system to allow the settling of the word contents of the 256 circulating shift registers of the bank of shift registers 408, after all of such words have been shifted thereto from RAM 405.

Each data word is entered into each of the word locations of RAM 405 from the output of AND gate 171 in parallel manner via bus 174. Such words then pass serially from the word locations of RAM 405 through the appropriate OR gate of OR gates 406 into the corresponding circulating shift registers of the 256 circulating shift registers of the bank of shift registers 408.

Assume that all 256 occurrences of the combinations of three binary ones of binary bits A, B, and C have occurred so that all of the 256 word locations of RAM 405 are full (i.e., have a data word stored therein) and that all 256 of the circulating shift registers of the bank of shift registers 408 a word (a finely quantized value of bit B) at the end of the cycle when the end-of-cycle pulse occurs and is applied to input lead 509 of FIG. 12.

As discussed above, counter 313 will become enabled by the high level set output of flip-flop 442 supplied to enable input 317 of counter 313 and will count from zero upwards in response to the clock pulses supplied from clock source 451 (contained in controller timer 294). When counter 313 receives its first clock input it will then contain a count of one which will be decoded by decoder 448 and a signal supplied through OR gate 550 to energize the first circulating shift register in the bank of shift registers 408.

At this time, clock pulses are being supplied to the shift-out clock pulse input 423 from the output of AND gate 446 and generated by the much higher clock rate of clock source 440. More specifically, the clock rate of clock source 440 must be at least ten times that of clock rate of clock pulse source 451 since each circulating shift register of the bank of shift registers 408 has ten stages therein, as discussed above.

Thus the ten bits in the first circulating shift register of the bank of shift registers 408 are shifted therefrom via output lead 411 to input 412 of OR gate 410, and also shifted back to the input of the first circulating shift register in the bank of shift registers 408. Thus, at the end of the first ten shift-out clock pulses the ten bits in the first circulating shift register have been circulated completely around the circulating shift register in addition to also appearing at the output of OR gate 410.

When the tenth bit is circulated out of the first circulating shift register, the count-to-ten counter 424 will supply an output via lead 425 back to the increment-by-one input of counter 313 so that counter 313 will now have a count of two therein and will access the number two shift register in the bank of shift registers 408 via decoder 448 and OR gate 552 and the cycle will repeat. Ten more shift-out pulses will be supplied from clock source 440 through AND gate 446 to the output of OR gate 410 and also back to input of the second shift register in the bank of shift registers 408 via lead 420.

Count-to-10 counter 424 of FIG. 12 will again respond to the tenth shift-out clock pulse to supply an output back to the increment-by-one input of counter 313 to increase the count of counter 313 to a count of three, thereby addressing the third shift register in the bank of shift registers 408.

This process will continue until the count in counter 313 equals the count stored in storage means 472 which, as will be recalled, is equal to the total number of the combinations of all binary ones of the binary bits A, B, and C that occurred in the previous cycle. When such coincidence of the contents of counter 313 and storage means 472 occurs, the compare logic 470 will output a compare pulse on output lead 474 which will be supplied through OR gate 466 to reset to zero the counter 313 and, via lead 476, will also advance the three-stage counter 478 to a count of three which will set flip-flop 438. The setting of flip-flop 438 will cause the switching logic comprising MUX 426 to switch its output from accumulator 428 to summing logic 434.

The count of three of counter 444 also resets flip-flop 442 to disable AND gate 446 (through delay 513) and prevent further shifting out of the contents of the shift registers of the bank of shift registers 408 at this time.

It should be noted at this point that while receiving the output of the shift registers of the bank of shift registers 408 the accumulator 428 simply performed the function of accumulating all of the finely quantized samples of the B bit during a given cycle (the previous cycle) for that number of occurrences of the combination of all binary ones of the binary bits A, B, and C.

The output of accumulator 428 can be seen to be equal to the contents of storage device 472. Such contents of storage device 472 were transferred therein from counter 307 at the same time that the contents of counter 307 were transferred via bus 521 to divider 430 (where N=number of occurrences of consecutive bits A, B, and C all equalling a binary 1). The output of divider 430 is thus the average magnitude of the finely quantized B samples of the combination of the three consecutive binary ones of binary bits A, B, and C.

As such, the value obtained from the single central B bit is the same for each of these times, assuming that the intersymbol interference contributed by the preceding and succeeding pulses, that is the trailing edges which add to the voltage, are the same.

Thus, the only difference between the values of the samples obtained from the sampled B bit must be due to the thermal noise value existing at the time that the sampling takes place. The foregoing is extremely important and is the reason why the data has been segregated and arranged in the manner described in the specification.

To repeat, the voltages that are finely quantized in the samples of the B bits, are all one form of the three bits A, B, and C, plus a noise value, and such signals are identical to one another; i.e., they are each comprised of all binary 1's so that the same intersymbol interference voltages are adding together. The only difference between them is the noise value at the time of sampling of the B bit. Hence, in effect, they are realizations of a normal probability distribution, the mean value being the noise free value.

If the entries of the list of digitized samples of the B bits are labeled $X_0$, $X_1$, $X_2$, etc., up to $X_N$, where N is the highest value on the list, then the sample mean and the sample variance of the entries on the list can be computed by the following formulae:

$$\overline{X} = \sum_{i=1}^{N} X_i/N$$

$$\overline{V} = \sum_{i=1}^{N} (X_i - \overline{X})^2/(N-1)$$

Once the sample mean and sample variance are computed in accordance with Expressions 1 and 2, the error probability $P_e$ can be looked up in a suitable look-up table using the standard formula;

$$P_e = \int_{\frac{\overline{X}}{\sqrt{\overline{V}}}}^{\infty} \frac{1}{\sqrt{2\pi}} e^{-\frac{x^2}{2}} dx = Q\left(\frac{\overline{X}}{\sqrt{\overline{V}}}\right) =$$

$$\frac{1}{2}\left[1 - \text{erf}\left(\frac{\overline{X}}{\sqrt{2\ \overline{V}}}\right)\right]$$

The error probability, thus computed, is the error probability of the list or equivalently the conditional error probability when a particular data pattern of a given central bit (bit B) plus one succeeding and one preceding bit occur in the modem. Conditional error probability can thus be computed from each test. In the example where L=2, there would be 32 such conditional error probabilities. The overall error probability would thus be obtained by adding the individual error probabilities and dividing by 32.

For a more detailed discussion of the formula of Expression 3, reference is made to section 5.6, pages 330–336 inclusively, of a publication entitled "Information Transmission, Modulation, and Noise" by M. Schwartz and contained in the Second Edition 1970 publication by McGraw Hill Book Co.

Additional information regarding Expressions 1, 2 and 3 above is contained in a publication entitled "Handbook of Mathematical Functions" published by the National Bureau of Standards, the fourth printing of 1965. See specifically section 26.2 and table 26.1 of the Bureau of Standards publication identified immediately above, which contains numerical values.

The next step in the computation of the estimated current bit error rate is to obtain the sum of the quantities $(X_i-\overline{X})^2$ where $X_i$ is the binary value of the finely quantized sample of the B bit and $\overline{X}$ is the output of the divider 430.

To execute the above described next step, it is necessary to again shift the finely quantized (digitized) binary values of the B bits stored in the 256 shift registers of the bank of shift registers 408 therefrom and perform the calculations indicated within the logic of blocks 434 and 436. It is for the above reason that each of the binary values in the 256 circulating shift registers of the bank of shift registers 408 were shifted back (i.e., originally recirculated back) into the particular circulating shift register of the bank of shift registers 408 from which they were read.

Furthermore, to re-read (recirculate) the contents of the 256 circulating shift registers the second time, it is necessary to reset counter 313 back to zero and to then count back up to the value stored in storage means 472, which value is the number of occurrences of three binary ones for the bits A, B, and C for the previous cycle, as described above. Such compare pulse on lead 474 will again be supplied back through OR gate 466 for a second time to reset counter 313 to zero. The process of shifting out the contents of the circulating shift registers of the bank of shift registers 408, one by one, beginning with the first shift register and working down through the entire 256 shift registers of the bank of shift registers 408, is done the second time with the contents of the 256 shift registers again appearing at output of OR gate 410 and passing through MUX 426.

However, during this second read-out of the contents of the shift registers of the bank of shift registers 408 the contents of such shift registers are supplied to logic 434 rather than accumulator 428 for the reasons stated above. The output of the calculations made in logic 434 (i.e., the values $\Sigma[X_i-\overline{X}]^2$ are then divided by the quantity (N+1) in divide logic 436 to obtain the value $\overline{X}_1$, which is the mean value of the 256 finely quantized samples of the B bits taken when all of the binary bits A, B, and C were binary ones.

It should be noted that for each permutation of binary ones and zeros in the eight possible sets of three binary ones and zeros that there will be only one $\overline{X}$ and one $\overline{V}$ for a total of eight $\overline{X}$'s and eight $\overline{V}$'s, which must then be processed in a suitable manner to derive an average thereof which is indicative of the bit rate error of the overall system.

Referring now to FIG. 13, which fits together with FIG. 12 in the manner shown in FIG. 14, all of the eight $\overline{X}$ quantities ($\overline{X}_1$-$\overline{X}_8$) and all of the eight $\overline{V}$ quantities ($\overline{V}_1$-$\overline{V}_8$) are processed in the following manner.

The eight $\overline{X}$ quantities are each supplied to one input of the eight transmission gates 250–257 respectively. The eight $\overline{V}$ quantities are each supplied to one input of the eight transmission gates 240–247 respectively. A count-to-nine counter 266, energized by a suitable clock 291 supplies an output to decoder 268 whose output, which includes counts 1–9, has the individual counts of counts 1–8 supplied respectively and simultaneosuly to second inputs of transmissions gates 250–257 and also respectively to second inputs of transmission gates 240–247.

Thus, for example, at the count of one from counter 266 transmission gates 250 and 240 will become conductive to pass the values of $\overline{X}_1$ and $\overline{V}_1$, respectively, through OR gates 260 and 236, respectively. The value $\overline{V}_1$ will pass through square root logic 300 to produce a value $\sqrt{\overline{V}_1}$ value will then be supplied to divider 302 as the divisor of the expression $\overline{X}_1/\sqrt{\overline{V}_1}$. The value $\overline{X}_1$ will pass directly from the output of OR gate 260 to divider 302 to function as the dividend of the expression $\overline{X}_i/\sqrt{\overline{V}_i}$. The outputs of divider 302 are supplied to RAM 304 as addresses of word locations in the look-up table of RAM 304, whose contents contain values of $P_{e1}$ to $P_{e8}$, which are defined herein as probable bit error rates.

Similarly, at the count of two from counter 266, the decoder 268 will energize transmission gates 251 and 241 so that $\overline{X}_2$ and $\overline{V}_2$ will pass through OR gates 260 and 236. Again, the value $\overline{V}_2$ will pass through square root logic 300 to produce the square root of $\overline{V}_2$ ($\cdot V^2$) which is then supplied to divider 302 as a divisor. The $\overline{X}$ output from OR gate 260 is supplied directly to divider 302 as the dividend. The output of divider 302 is again an address which addresses one of the word locations in the look-up table of RAM 304 which word location contains a value of $P_{e2}$. $P_{e2}$ is the computed probable bit error rate for all of the samples from which $\overline{X}_2$ and $\overline{V}_2$ are derived, namely, the combination of the three bits A, B, and C shown in FIG. 3.

The value $P_{e2}$ is supplied to accumulator 306. When all eight values of $P_e$ (i.e., $P_{e1}$-$P_{e8}$) have been accumulated in accumulator 306 the counter 266 will output a count of nine which will appear on output lead 273 of decoder 268 and which will cause divider 308 to divide the sum of the eight $P_e$ values by weight to produce the value $P_{e\ (average)}$ at the output of divider 308. $P_{e\ (average)}$ is the average rate of bit error for the entire system.

To insure the proper sequence of the above events, the end-of-cycle pulse is supplied through delay 290 to counter 266 to delay the next count of counter 266 until each of the computations of the $\overline{X}$ and the $\overline{V}$ values, calculated in the logic of blocks 300, 302, 306, and 308 of FIG. 13 to determine the value of $P_{e\ (average)}$, have had time to settle.

I claim:
1. In a communication system for transmitting and receiving a high speed stream of data bits, a method of determining the current bit error rate but not the specific bits that are in error and comprising the steps of:
   extracting and storing consecutive sequences of A, B, and C data bits at known and identifiable time intervals, where A and C are an equal small number of bits and B is a single bit;
   extracting and storing finely quantized sample of the amplitude of the center portion of the B data bit by auxiliary means shown in FIG. 1;
   storing in memory the finely quantized center amplitudes of the B bit for each different combination of binary 1's and 0's for each different sequence of bits A, B, and C;

calculating from known and predetermined algorithms the current bit error rate of the system from the information stored in said memory.

2. In a communication system employing a high speed stream of data bits, a method of determining the current bit error rate and comprising the steps of:

extracting and storing consecutive sequences of N+1 data bits at identifiable time intervals spaced apart M bits where M>>N, where N is an even number, and where N+1 can be any combination of binary 1's and 0's;

digitizing and storing a finely quantized sampling of a data bit B selected from the center of each of said N+1 sequences to form a sequence of bits N/2, B, and N/2, which equals N+1 data bits, where B=1 bit;

providing a plurality of $2^{(N+1)}$ memories with each memory selectable by a corresponding one of the combination of bits $2^{(N+1)}$ and each have having a memory location for storing the finely quantized value of the B bit;

entering the finely quantized values of the B bit into successive memory locations of the corresponding memory as the corresponding combination of N+1 bits are extracted from said high speed stream of data bits; and calculating from a predetermined algorithm and the stored values of the finely quantized B bit samples the bit error rate of the system.

* * * * *